(12) United States Patent
Kaatz et al.

(10) Patent No.: US 9,196,087 B2
(45) Date of Patent: Nov. 24, 2015

(54) METHOD AND APPARATUS FOR PRESENTING GEO-TRACES USING A REDUCED SET OF POINTS BASED ON AN AVAILABLE DISPLAY AREA

(75) Inventors: Christian Kaatz, Berlin (DE); Jan Kurella, Berlin (DE)

(73) Assignee: HERE GLOBAL B.V., Veldhoven (NL)

( * ) Notice: Subject to any disclaimer, the term of this patent is extended or adjusted under 35 U.S.C. 154(b) by 394 days.

(21) Appl. No.: 13/452,243

(22) Filed: Apr. 20, 2012

(65) Prior Publication Data

US 2013/0278594 A1 Oct. 24, 2013

(51) Int. Cl.
*G06T 5/00* (2006.01)
*G06T 3/40* (2006.01)
*G06T 17/05* (2011.01)
*G06T 11/20* (2006.01)

(52) U.S. Cl.
CPC ............... *G06T 17/05* (2013.01); *G06T 3/4007* (2013.01); *G06T 11/203* (2013.01)

(58) Field of Classification Search
CPC ........... G06T 11/206; G06T 5/00; G06T 3/40; G06T 19/00; G06T 11/20; G06T 17/05; G06T 2219/2016; G06T 15/00; G06T 11/203; G06T 3/4007; G01C 21/3626; G01C 21/3667; G01C 21/367; G01C 21/3676; A61F 2002/30943; G08G 1/0969
USPC .............................. 345/440, 419, 619, 428, 54
See application file for complete search history.

(56) References Cited

U.S. PATENT DOCUMENTS

| | | | |
|---|---|---|---|
| 6,373,489 B1 * | 4/2002 | Lu et al. ........................ | 345/428 |
| 8,164,596 B1 * | 4/2012 | Bech ............................. | 345/473 |
| 2010/0208937 A1* | 8/2010 | Kmiecik et al. .............. | 382/100 |
| 2011/0285741 A1* | 11/2011 | Kilgard ......................... | 345/589 |
| 2012/0027298 A1* | 2/2012 | Dow et al. .................... | 382/173 |
| 2012/0098858 A1* | 4/2012 | Wallace et al. ............... | 345/629 |
| 2012/0188255 A1* | 7/2012 | Brunner et al. ............... | 345/473 |
| 2012/0235988 A1* | 9/2012 | Karafin et al. ................ | 345/419 |
| 2013/0142453 A1* | 6/2013 | Kandal et al. ................. | 382/300 |
| 2013/0257888 A1* | 10/2013 | Behrens et al. ............... | 345/589 |

* cited by examiner

*Primary Examiner* — Kee M Tung
*Assistant Examiner* — Yuehan Wang
(74) *Attorney, Agent, or Firm* — Ditthavong & Steiner, P.C.

(57) ABSTRACT

An approach is provided for presenting geo-traces using a reduced set of points based on an available display area. The trace platform determines a reduced set of one or more points based on an available display area of a user interface. Next, the trace platform causes, at least in part, a presentation of at least one geo-trace in the user interface based, at least in part, on the reduced set.

18 Claims, 15 Drawing Sheets

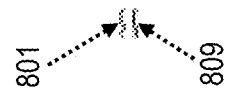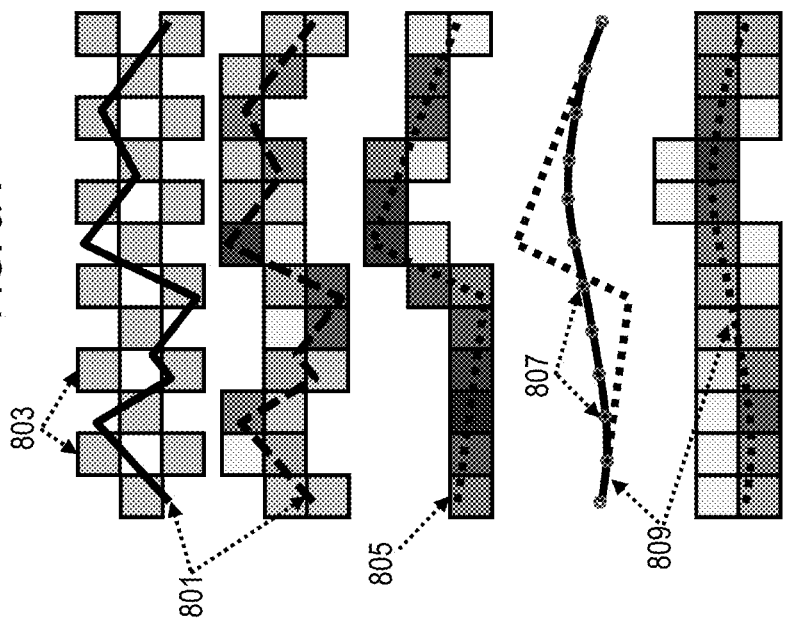

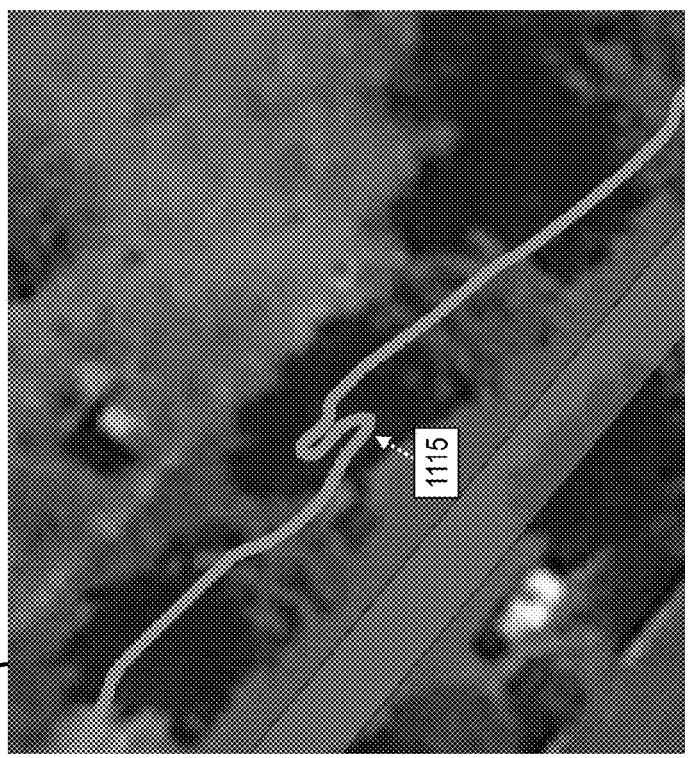
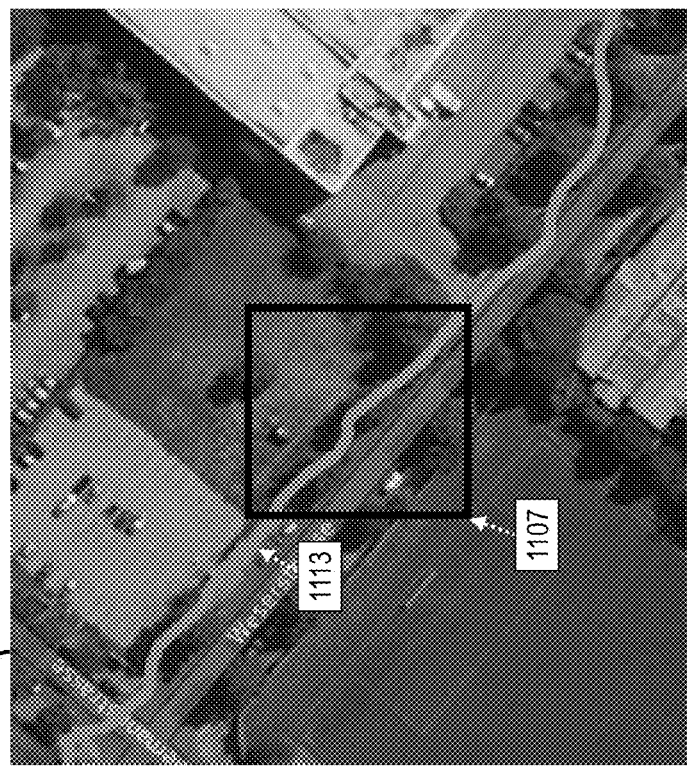

METHOD AND APPARATUS FOR PRESENTING GEO-TRACES USING A REDUCED SET OF POINTS BASED ON AN AVAILABLE DISPLAY AREA

BACKGROUND

Service providers and device manufacturers (e.g., wireless, cellular, etc.) are continually challenged to deliver value and convenience to consumers by, for example, providing compelling network services. One area of interest has been the development of services and technologies relating to visualization of Global Positioning System (GPS) traces. For example, service providers may utilize GPS trace data to offer users a visualization of their past movements. However, typical visualizations offered by service providers may not accurately represent the actual movements, may blur the traces of the actual movements, etc., especially when there are a lot of twists and turns associated with those movements.

SOME EXAMPLE EMBODIMENTS

Therefore, there is a need for an approach for presenting geo-traces using a reduced set of points based on an available display area.

According to one embodiment, a method comprises determining a reduced set of one or more points based on an available display area of a user interface. The method also comprises causing, at least in part, a presentation of at least one geo-trace in the user interface based, at least in part, on the reduced set.

According to another embodiment, an apparatus comprises at least one processor, and at least one memory including computer program code for one or more computer programs, the at least one memory and the computer program code configured to, with the at least one processor, cause, at least in part, the apparatus to determine a reduced set of one or more points based on an available display area of a user interface. The apparatus is also caused to cause, at least in part, a presentation of at least one geo-trace in the user interface based, at least in part, on the reduced set.

According to another embodiment, a computer-readable storage medium carries one or more sequences of one or more instructions which, when executed by one or more processors, cause, at least in part, an apparatus to determine a reduced set of one or more points based on an available display area of a user interface. The apparatus is also caused to cause, at least in part, a presentation of at least one geo-trace in the user interface based, at least in part, on the reduced set.

According to another embodiment, an apparatus comprises means for determining a reduced set of one or more points based on an available display area of a user interface. The apparatus also comprises means for causing, at least in part, a presentation of at least one geo-trace in the user interface based, at least in part, on the reduced set.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of the originally filed method claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIGS. 8A and 8B are diagrams illustrating the reduction of sharp corners associated with a geo-trace over a few pixels, according to various embodiments;

FIGS. 11A-11D are diagrams of a map user interface for presenting geo-traces using a reduced set of points based on an available display area, according to various embodiments;

DESCRIPTION OF SOME EMBODIMENTS

Examples of a method, apparatus, and computer program for presenting geo-traces using a reduced set of points based on an available display area are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
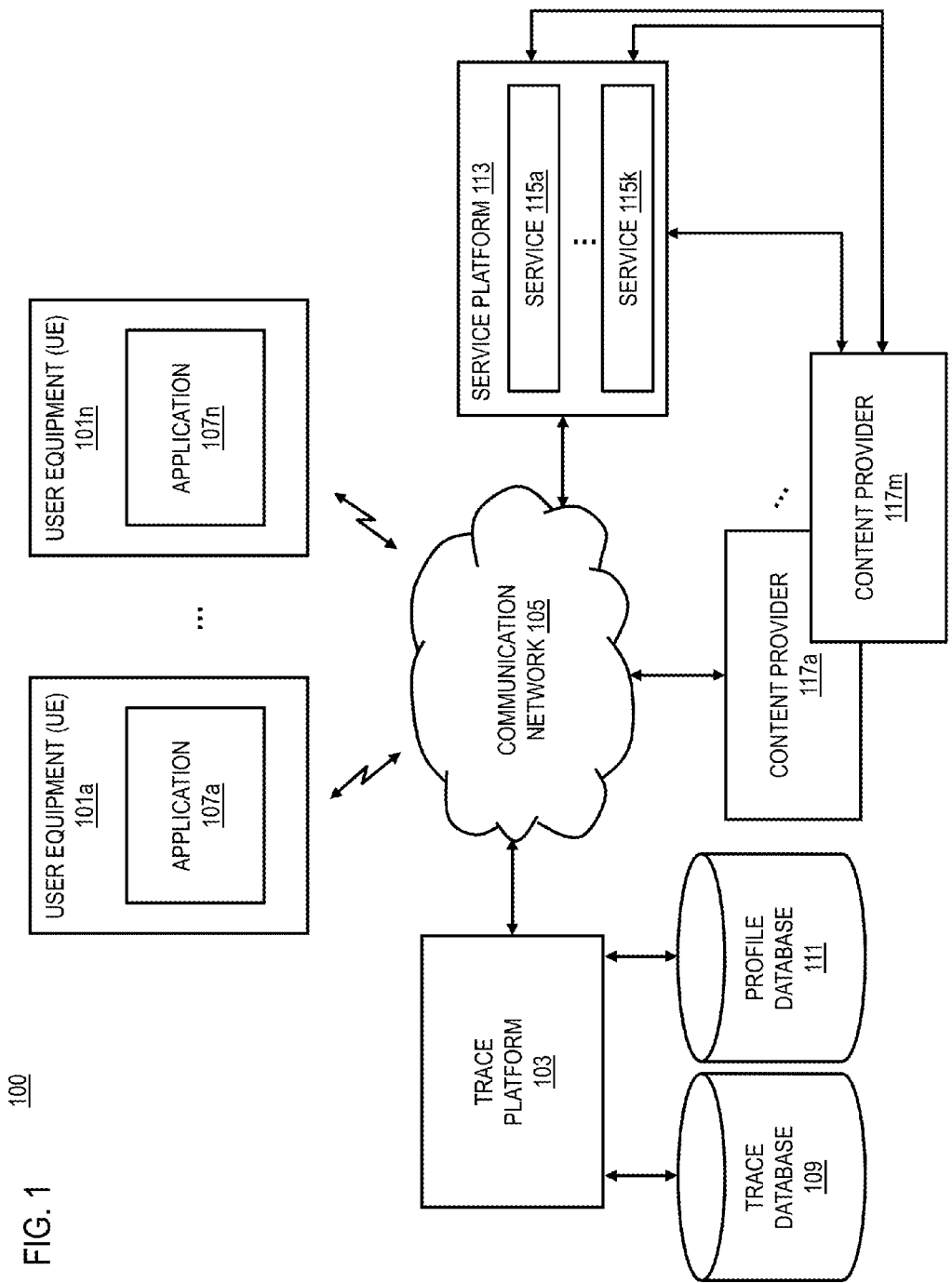
FIG. 1 is a diagram of a system capable of presenting geo-traces using a reduced set of points based on an available display area, according to one embodiment.

FIG. 1 is a diagram of a system capable of presenting geo-traces using a reduced set of points based on an available display area, according to one embodiment. As discussed, typical visualizations of past movements may not accurately represent the actual movements, may blur the traces of the actual movements, etc., especially when there are a lot of twists and turns associated with those movements. For example, when zoomed in deeply, sparse GPS data may lead to very hard joints in the traces, which does not accurately represent the true movements (e.g., when the movements are associated with sport activities with a lot of twists and turns). On the other hand, when zoomed out, the transversal movement of sport activities may blur the actual line and badly represent the main movements.

To address this problem, a system 100 of FIG. 1 introduces the capability to present geo-traces using a reduced set of points based on an available display area. Specifically, the system 100 may determine a reduced set of points based on an available display area of a user interface, and then cause a presentation of at least one geo-trace in the user interface based on the reduced set. It is noted that although various embodiments are described with respect to geo-traces associated with one or more movements, it is contemplated that the approach described herein may be used with other geo-traces, such as geo-traces that represent movements and/or lines in a two-dimensional and/or a three dimensional space. In one scenario, the available display area for a geo-trace associated with a river may be a 20 by 20 pixel area of a map user interface in which the visible extent of the geo-trace exists, for instance, when zoomed out. As such, the determined reduced set of points for the geo-trace may be limited to at most 400 geo-trace points (e.g., up to one point for each pixel of the pixel area even though there may be many more points for the geo-trace of the river). However, to improve performance, not all potential 400 geo-trace points may be utilized as part of the reduced set of points. In another scenario, when the user interface is zoomed in on the geo-trace associated with the river, only a portion of the geo-trace is within the available display area (e.g., the entire display area of the map user interface). As such, the visible extent of the geo-trace may only include that particular portion of the geo-trace. Thus, the geo-trace points that are outside of the available display area may not be included in the reduced set of points. As a result, only the geo-trace points that are within the available display area may be utilized for rendering the geo-trace on the map user interface.

As shown in FIG. 1, the system 100 comprises a user equipment (UE) 101 (or multiple UEs 101a-101n) having connectivity to a trace platform 103 via a communication network 105. The UE 101 may include or have access to an application 107 (e.g., applications 107a-107n) to enable the UE 101 to interact with, for instance, the trace platform 103, which may: (1) determine a reduced set of points based on an available display area of a user interface; (2) present a geo-trace in the user interface based on the reduced set; (3) determine the available display area based on a zoom level associated with the user interface; (4) determine a threshold number of points for the presentation of the geo-trace based on the zoom level; (5) smooth out the geo-trace based on the reduced set; (6) designate the points of the reduced set as anchor points and/or other points in between the points of the reduced set as control points; (7) process the anchor points and the control points to generate one or more curves (e.g., Bezier curves); or (8) perform other functions.

In various embodiments, the trace platform 103 may include or have access to a trace database 109 to access or store trace data (e.g., GPS data of user movement, map data, etc.). The trace platform 103 may also include or have access to a profile database 111 to access or store profile information associated with users (e.g., user identification, passwords, history information of the users, etc.). Data stored in the trace database 109 and the profile database 111 may, for instance, be provided by the UEs 101, a service platform 113, one or more services 115 (or services 115a-115k), one or more content providers 117 (or content providers 117a-117m), and/or other services available over the communication network 105. For example, a certain service 115 may gather trace data associated with users from the UEs 101 and provide the trace data to the trace database 109. In addition, those users may register with the particular service 115, or another service 115, to access visualizations of geo-traces representing their movements. The registration information may then be stored as account information in the profile database 111. It is noted that the trace platform 103 may be a separate entity of the system 100, a part of the one or more services 115 of the service platform 113, or included within the UE 101 (e.g., as part of the application 107).

By way of example, the communication network 105 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

In another embodiment, the trace platform 103 may determine the available display area based, at least in part, on a zoom level associated with the user interface. By way of example, the available display area may be the area that contains the visible extent of a geo-trace based on the particular zoom level of the user interface. When zoomed all the way, for instance, the available display area may be a 20 by 20 pixel area that depicts the geo-trace. On the other hand, when zoomed in, the available display area may be a 400 by 400 pixel area that only depicts a portion of the geo-trace (e.g., the zoomed-in portion).

In another embodiment, the trace platform 103 may determine a threshold number of points for the presentation of the at least one geo-trace based, at least in part, on the zoom level, wherein the reduced set is further based, at least in part, on the threshold number. In certain embodiments, the reduced set may be further based on a Ramer-Douglas-Peucker algorithm, and the threshold number may represent a maximum number of points to return from the Ramer-Douglas-Peucker algorithm. In one use case, a geo-trace of a traveled route may fit within a 20 by 20 pixel area of an available display area of a map user interface when the zoom level is low (e.g., zoomed out). The 20 by 20 pixel area may, for instance, be determined by the particular zoom level. Lines connecting all of the points of the geo-trace (e.g., connected based on capture time of the geo-trace points) may, however, only overlay 100 pixels of the 20 by 20 pixel area (e.g., there may be multiple points overlaying the same pixel). As a result, the maximum number of points to return from the Ramer-Douglas-Peucker algorithm (e.g., to determine a similar trace with fewer points) may, for instance, be set at 100 geo-trace points.

In another embodiment, the trace platform 103 may cause, at least in part, a smoothing of the at least one geo-trace based, at least in part, on the reduced set, wherein the presentation of the at least one geo-trace is further based, at least in part, on the smoothing. In a further embodiment, for instance, the trace platform 103 may determine one or more other points in between the one or more points of the reduced set. The trace platform 103 may then process and/or facilitate a processing of the one or more points of the reduced set and the one or more other points to cause, at least in part, a generation of one or more curves (e.g., Bezier curves), wherein the smoothing of the at least one geo-trace is further based, at least in part, on the one or more curves.

In another embodiment, the trace platform 103 may cause, at least in part, a designation of the one or more points as one or more anchor points of one or more Bezier curves, the one or more other points as one or more control points of the one or more Bezier curves, or a combination thereof. By way of example, some of the points of the reduced set may be designated as anchor points for Bezier curves that will be rendered to present a more realistic version of the original geo-trace. New points may then be identified as control points in between the anchor points so that a Bezier algorithm can create interpolated points that create a smooth line through each anchor point.

In another embodiment, the trace platform 103 may determine that at least one of the one or more points of the reduced set are within proximity to at least one corner of the at least one geo-trace, wherein at least one of the one or more curves is based, at least in part, on the at least one of the one or more points. In one scenario, a GPS device in an automobile (e.g., the user's mobile phone, a GPS device of the automobile, etc.) may periodically collect geo-trace points to determine the traveled route of the user driving the automobile. As such, the geo-trace associated with the traveled route may include dense points when the automobile slows down, for instance, to go around a curve, to turn a corner, etc. Thus, dense points may be utilized to determine curves (as opposed to sharp corners) that more accurately reflect the traveled route of the automobile. Accordingly, in some embodiments, if it is determined that a geo-trace includes dense points near a corner of the geo-trace, the trace platform 103 may include those dense points in the reduced set of points and draw a Bezier curve between the points of the dense points that are nearest to the corner.

According to one embodiment, the smoothing of a geo-trace may include: (1) dividing the path into useful segments; (2) ensuring a certain number of control points in each segment; and (3) smoothing the geo-trace by generating Bezier curves. For illustrative purposes, an implementation of the three primary steps may, for instance, include (but is not limited to) the guidelines shown in Tables 1, 2, and 3 below:

TABLE 1

Dividing Path Into Segments

The detection of anchor points for the final line is based on pure distance. Two consecutive anchor points should have at least a minimum distance but not be more far away than two times this distance. (Factors are configurable)
    (1) Parameters
        (a) minimumDistance between two points on map (e.g., real distance between two pixel) required
        (b) smoothingFactor: approximate minimum number of points added per segment to smooth the curve (e.g., default: 5)

TABLE 1-continued

Dividing Path Into Segments (c) smoothDistance: minimumDistance * smoothingFactor
  (d) maximumDistance between two anchor points (e.g., default: 2 * smoothDistance)
 (2) Algorithm
  (a) Start of trace is by definition an anchor point (e.g., $a_1 = t_0$)
  (b) Next anchor point needs to be more far away than minimumDistance
   $a_n = t_j | \Sigma_{i=n-1}^{j} dist(a_i, a_{i+1}) >$ smoothDistance
  (c) If the total distance is bigger than the defined maximum distance take the last one
   instead: $a_n = t_{j-1}$
It is noted that, in other embodiments, a modified Kurella-Kaatz-Simplification may be utilized
to detect the most significant anchor points instead of basing the identification of the anchor
points on pure distance. In such embodiments, the calculation time may increase, but may also
provide better results, especially on high zoomed-out levels.

TABLE 2

Ensuring Control Points

Other points between two anchor points may be considered control points. Only the most
important points are taken into consideration to obtain a "nice" line without overusing processing
and memory resources. At least two additional control points are added to guarantee a smooth
change on each edge:
 (1) Reduce control points to a small enough number
  (a) First segment is from start to end (e.g., FIG. 6A)
  (b) Calculate a point with the longest distance in this segment (e.g., FIG. 6A)
  (c) Loop until maximum number of segments is reached or biggest epsilon < break
   criteria (e.g., FIG. 6C)
   (i) Split segment with biggest epsilon at this point (e.g., FIG. 6B and 6C)
   (ii) Recalculate epsilon in both new segments
 (2) Add smooth change control points (e.g., FIG. 7B)
  (a) Create a helper vector parallel to an anchor's neighbours
  (b) ⅓ of length on each side is taken as distance from the anchor point on the helper line
  (c) The two additional control points are added in the appropriate segments to ensure
   smooth edges

TABLE 3

Smoothing the Geo-Trace

Figure 7B:
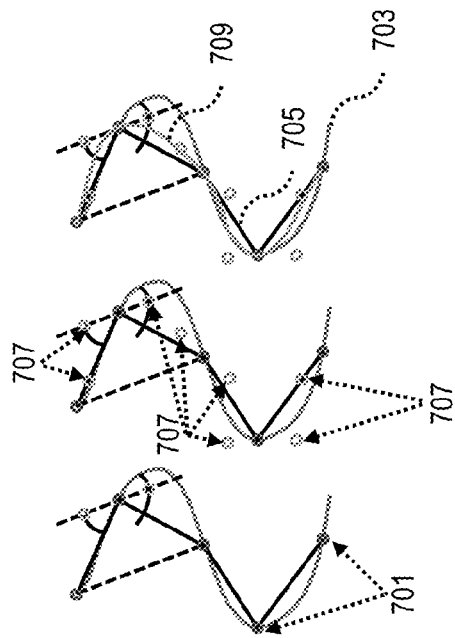
FIGS. 7A-7D are diagrams comparing a traveled route, a GPS trace, and a smoothed trace, according to various embodiments.
Figure 7D:
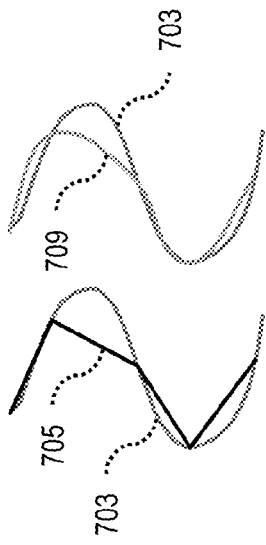
Figure 7A:
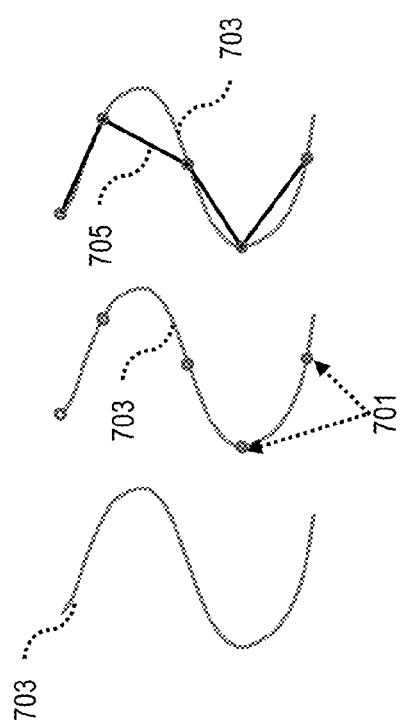

For each segment, apply $n^{th}$-level Bezier depending to the number of
control points (e.g., minimum $2^{nd}$-level Bezier) (FIGS. 7A and 8A).

By way of example, the UE 101, the trace platform 103, the service platform 113, the services 115, and the content providers 117 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
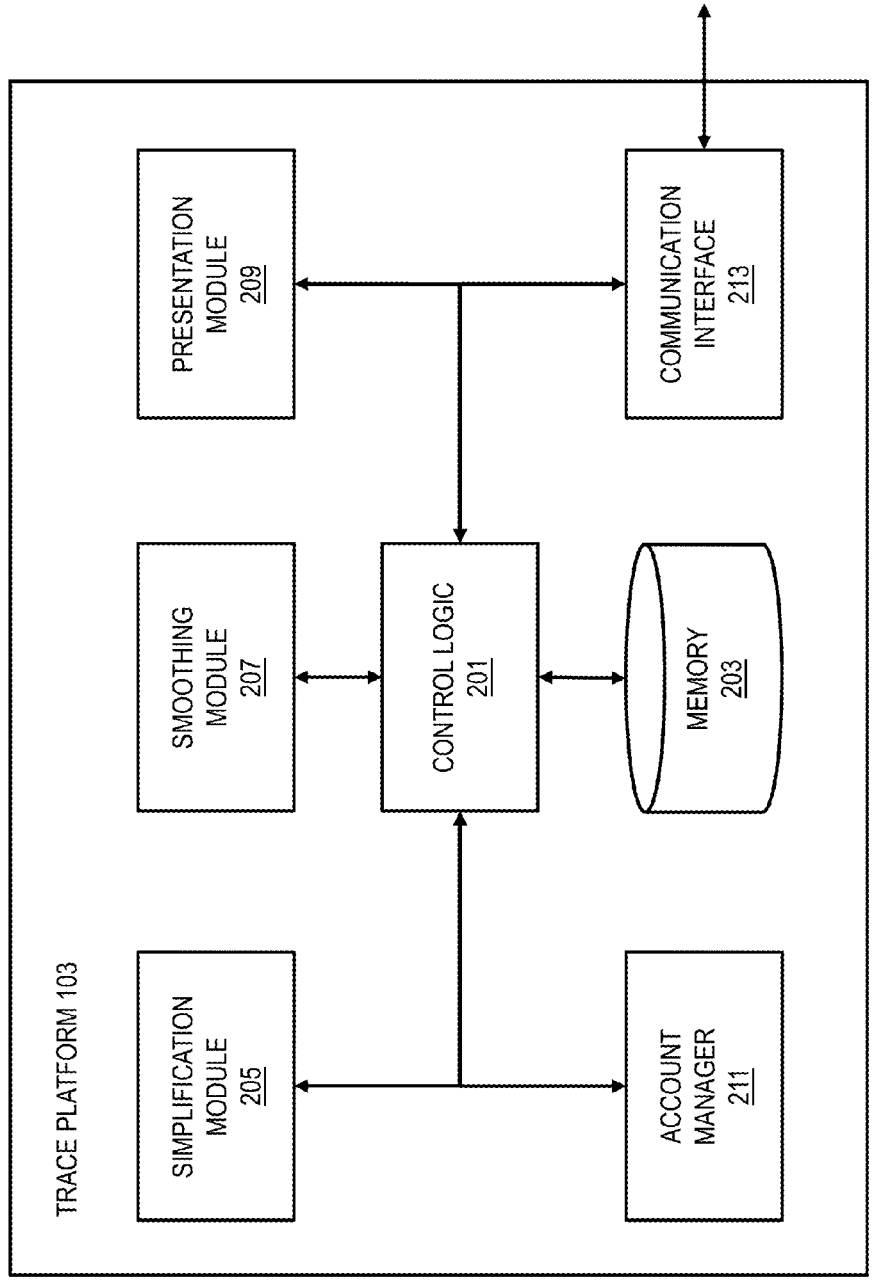
FIG. 2 is a diagram of the components of a trace platform, according to one embodiment.

FIG. 2 is a diagram of the components of a trace platform, according to one embodiment. By way of example, the trace platform 103 includes one or more components for presenting geo-traces using a reduced set of points based on an available display area. It is contemplated that the functions of these components may be combined in one or more components or performed by other components of equivalent functionality. In this embodiment, the trace platform 103 includes control logic 201, memory 203, a simplification module 205, a smoothing module 207, a presentation module 207, an account manager 211, and a communication interface 213.

The control logic 201 executes at least one algorithm for executing functions of the trace platform 103. For example, the control logic 201 may interact with the simplification module 205 to determine a reduced set of points based on an available display area of a user interface. In one use case, a GPS device may track the movements of a bicyclist by collecting location data points with respect to the bicyclist's position at various collection times (e.g., every few seconds for the duration of the bicyclist's trip). An initial geo-trace derived from the location data points and the various collection times associated with the location data points may then be supplied to the simplification module 205, which may determine a threshold number of points based on the zoom level of the user interface for which the rendering of the geo-trace associated with the bicyclist's movements will be presented. The simplification module 205 may thereafter run a Ramer-Douglas-Peucker algorithm with the threshold number (e.g., the maximum number of points to return for the reduced set), for instance, to limit the number of points generated for the reduced set according to the threshold number.

In certain embodiments, the smoothing module 207 may determine other points (e.g., control points) in between points of the reduced set (e.g., anchor points) to generate curves to smooth out the presentation of the geo-trace associated with the bicyclist's movements. As indicated, particular points of the reduced set may be designated as anchor points for generating Bezier curves, and the identified other points between the anchor points may be designated as control points for the Bezier curves. Thereafter, the control logic 201 may direct the presentation module 209 to present the smoothed geo-trace (e.g., with the Bezier curves) in the user interface. In this way, the presentation of the geo-trace associated with the bicyclist's movements is "nice," rather than sharp and edgy, and the geo-trace more realistically represents the bicyclist's movements (e.g., bicyclists very rarely make very sharp turns).

In some embodiments, the control logic may also utilize the account manager 211 to handle registration and user access to visualizations of geo-traces. For example, in one embodiment, the geo-trace visualizations may be included as part of managed services supplied by a service provider as a hosted or a subscription-based service. As such, users may need to register and log into such services to access visualizations of geo-traces that are associated with their movements, their friends' and families' movements, etc.

The control logic 201 may additionally utilize the communication interface 213 to communicate with other components of the trace platform 103, the UEs 101, the service platform 113, the services 115, the content providers 117, and other components of the system 100. For example, the communication interface 213 may be utilized to receive geo-trace points of a geo-trace (e.g., from the trace database 109, from a certain service 115, etc.) from which a reduced set may be generated. The communication interface 213 may further include multiple means of communication. In one use case, the communication interface 213 may be able to communicate over short message service (SMS), multimedia messaging service (MMS), internet protocol, email, instant messaging, voice sessions (e.g., via a phone network), or other types of communication.

Figure 3:
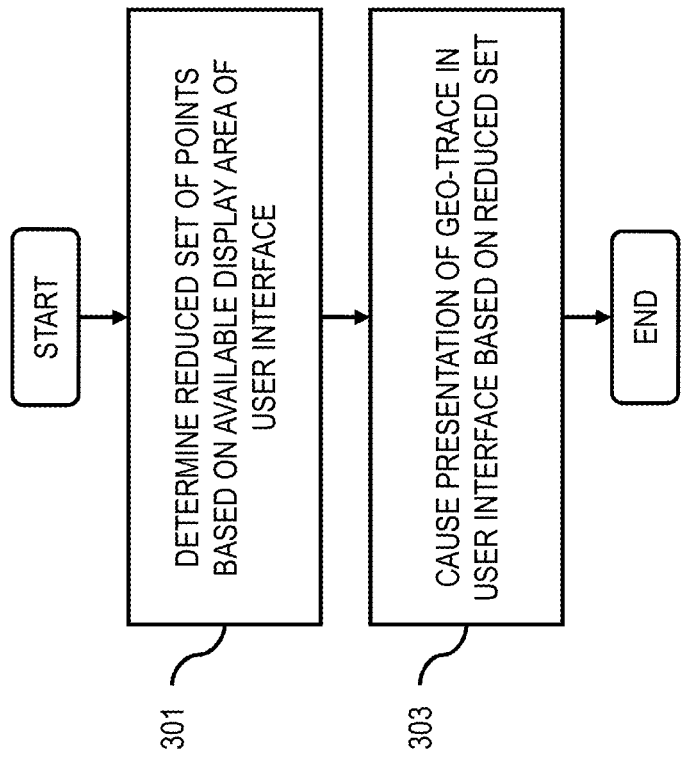
FIG. 3 is a flowchart of a process for presenting geo-traces using a reduced set of points based on an available display area, according to one embodiment.
Figure 13:
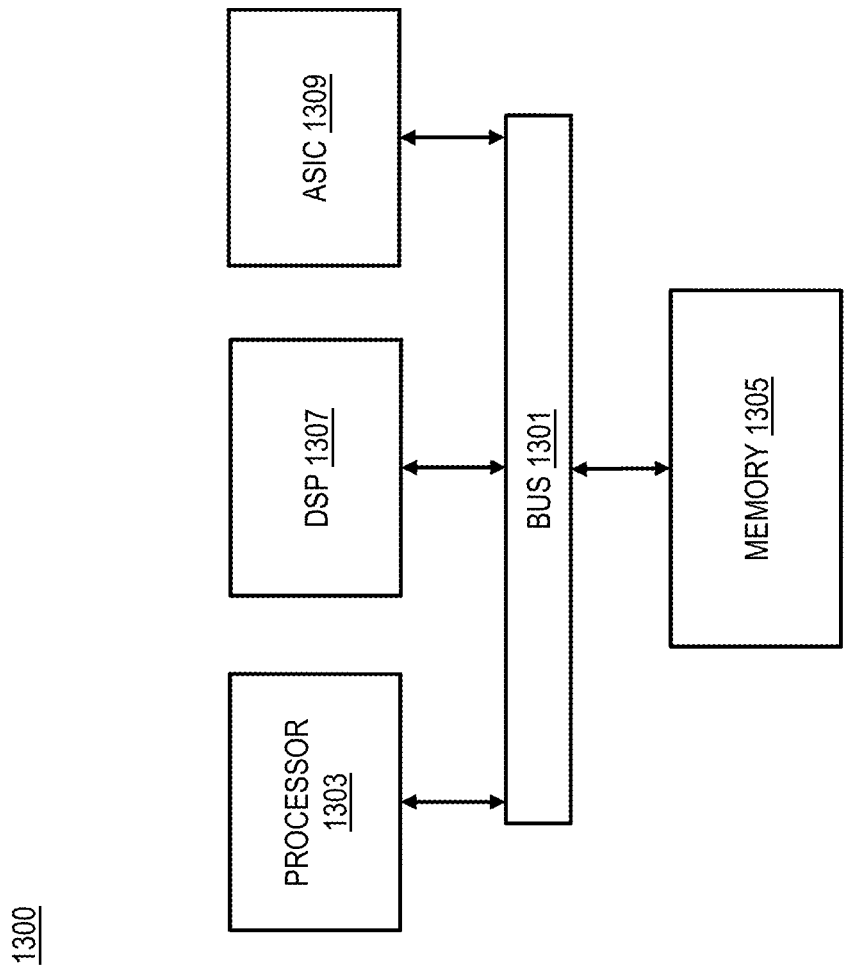
FIG. 13 is a diagram of a chip set that can be used to implement an embodiment of the invention.

FIG. 3 is a flowchart of a process for presenting geo-traces using a reduced set of points based on an available display area, according to one embodiment. In one embodiment, the trace platform 103 performs the process 300 and is implemented in, for instance, a chip set including a processor and a memory as shown in FIG. 13. As such, the control logic 201 can provide means for accomplishing various parts of the process 300 as well as means for accomplishing other processes in conjunction with other components of the trace platform 103.

In step 301, the control logic 201 may determine a reduced set of one or more points based on an available display area of a user interface. By way of example, the reduced set may be a selected subset of collected geo-trace points associated with one or more movements, one or more lines, or a combination thereof in a two-dimensional space, a three-dimensional space, or a combination thereof. In one use case, for instance, a location/navigation service may obtain location data points from a user's mobile device (e.g., a mobile phone with a GPS module) to form the full collection of geo-trace points associated with a particular traveled route of the user (e.g., while kayaking down a river). The control logic 201 may then determine the reduced set from the full collection of geo-trace points (e.g., received from the location/navigation service) based on the available display area of the user interface. As mentioned, the available display area may, for instance, be the visual extent of the geo-trace associated with the traveled route on the user interface. Thereafter, in step 303, the control logic 201 may cause a presentation of at least one geo-trace in the user interface based on the reduced set.

Figure 4:
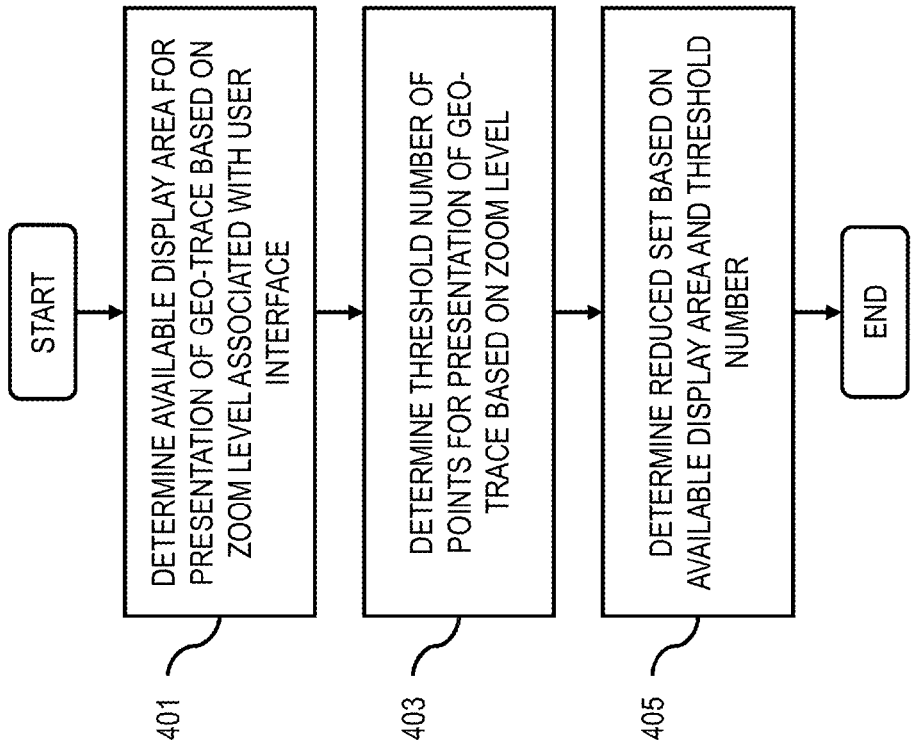
FIG. 4 is a flowchart of a process for determining a reduced set of points, according to one embodiment.

FIG. 4 is a flowchart of a process for determining a reduced set of points, according to one embodiment. In one embodiment, the trace platform 103 performs the process 400 and is implemented in, for instance, a chip set including a processor and a memory as shown in FIG. 13. As such, the control logic 201 can provide means for accomplishing various parts of the process 400 as well as means for accomplishing other processes in conjunction with other components of the trace platform 103.

In step 401, the control logic 201 may determine the available display area for the presentation of the geo-trace based on a zoom level associated with the user interface. In one use case, a map user interface may be set to a low zoom level (e.g., zoomed out). As such, based on the zoom level, the available display area may be a particular 20 by 20 pixel area on the user interface since the visual extent of the geo-trace is determined to be within that 20 by 20 pixel area. Moreover, at step 403, the control logic 201 may determine a threshold number of points for the presentation of the at least one geo-trace based on the zoom level. By way of example, the threshold number of points may be determined to be 50 points the zoom level is 3 (e.g., 3 notches away from the farthest zoomed-out notch), 60 points when the zoom level is 5, etc. In some embodiments, the size of the geo-trace (e.g., actual dimensions) may be considered along with the zoom level to determine the threshold number of points.

In step 405, the control logic 201 may determine the reduced set of the one or more points based on the available display area and the threshold number. As discussed, in certain embodiments, the reduced set may be further based on a Ramer-Douglas-Peucker algorithm, and the threshold number may represent a maximum number of points to return from the Ramer-Douglas-Peucker algorithm. As an example, when the zoom level is 5, the threshold number may be 60 points and only a portion of a geo-trace may be within the available display area. As input parameters, the Ramer-Douglas-Peucker algorithm may be modified to take the maximum number of points to return (e.g., 60 points) and a subset of the original geo-trace points that are part of the portion of the geo-trace within the available display area. In this way, resources utilization (e.g., time, processing power, and memory) associated with calculating the reduced set may be significantly decreased.

Figure 5:
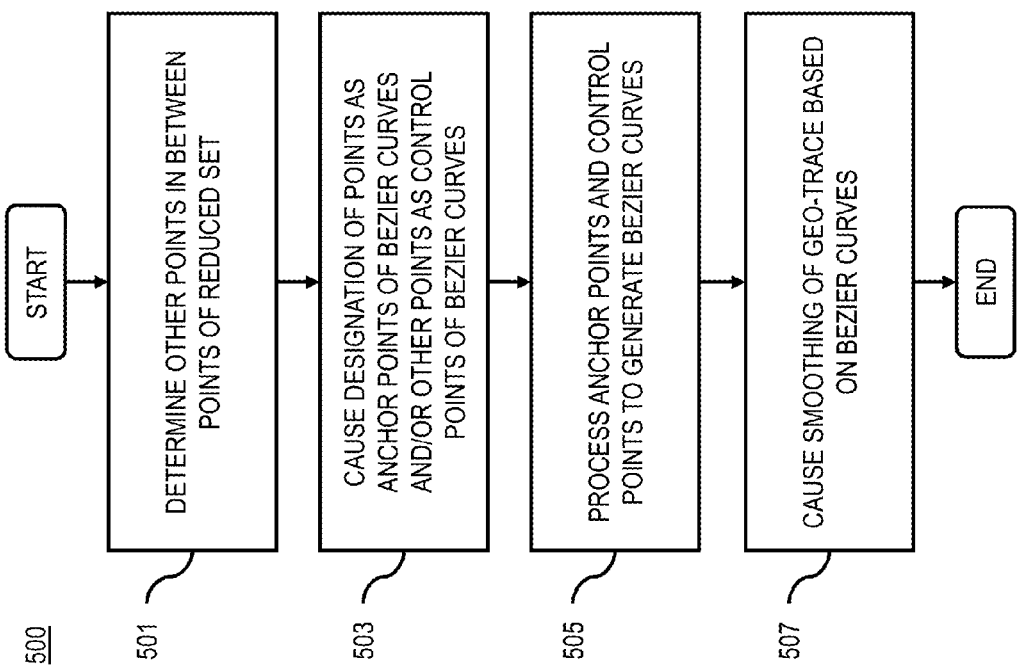
FIG. 5 is a flowchart of a process for smoothing of geo-traces, according to one embodiment.

FIG. 5 is a flowchart of a process for smoothing of geo-traces, according to one embodiment. In one embodiment, the trace platform 103 performs the process 500 and is implemented in, for instance, a chip set including a processor and a memory as shown in FIG. 13. As such, the control logic 201 can provide means for accomplishing various parts of the process 500 as well as means for accomplishing other processes in conjunction with other components of the trace platform 103.

In step 501, the control logic 201 may determine one or more other points in between the one or more points of the reduced set. As illustrated in step 503, some of the one or more points of the reduced set may then be designated as one or more anchor points of one or more Bezier curves, while some of the one or more other points may be designated as one or more control points of the one or more Bezier curves.

In step 505, the control logic 201 may process and/or facilitate a processing of the one or more anchor points and the one or more control points to cause a generation of the one or more Bezier curves. The control logic 201 may then, at step 507, cause a smoothing of the at least one geo-trace based on the one or more Bezier curves. By way of example, the one or more Bezier curves may replace segments of the at least one trace to form a smoother geo-trace that more accurately reflects the movements and/or lines that the at least geo-trace represents.

Figure 6A:
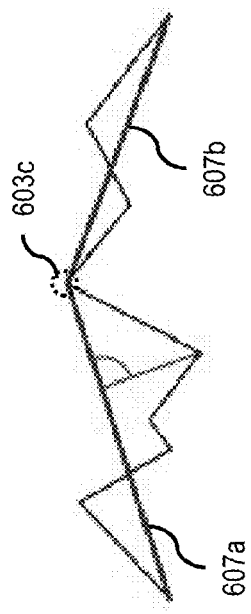
FIGS. 6A-6D are diagrams featuring smoothing of geo-traces based on a reduced set of points, according to various embodiments.

FIGS. 6A-6D are diagrams featuring smoothing of geo-traces based on a reduced set of points, according to various embodiments. As shown, FIGS. 6A-6D includes an initial geo-trace 601 having at least 9 points (e.g., at least one point for each sharp corner). As indicated, in some embodiments, the initial geo-trace 601 and a maximum number of points may be input parameters to a simplification algorithm (e.g., Ramer-Douglas-Peucker algorithm), for instance, to instruct the simplification algorithm to return up to the specified maximum number of points. For illustrative purposes, in FIGS. 6A-6D, the maximum number of points may be set to 4 based on a particular zoom level. As depicted in FIG. 6A, the algorithm may first determine that the most relevant points of the initial geo-trace 601 are points 603a and 603b, forming an initial segment 605 (e.g., based on the guidelines in Tables 1 and 2).

Figure 6B:
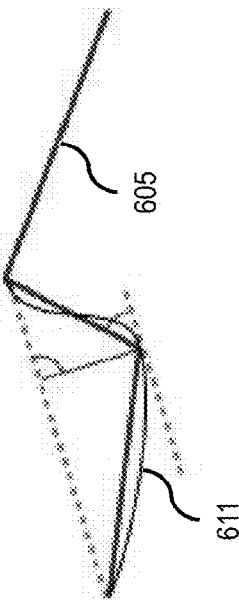
Figure 6C:
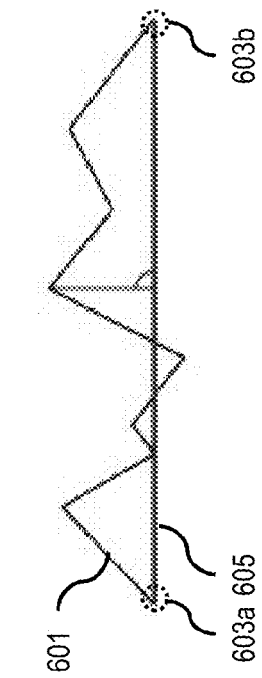
Figure 6D:
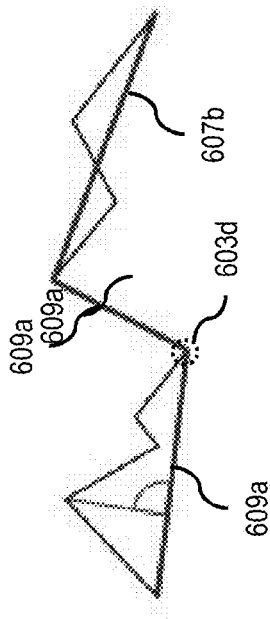

In FIG. 6B, the algorithm may then determine that point 603c is the next most relevant point of the initial geo-trace 601, forming segments 607a and 607b (e.g., based on the guidelines in Tables 1 and 2). In FIG. 6C, point 603d may be determined to be the next most relevant point of the initial geo-trace 601, forming segments 609a and 609b. The algorithm may then return points 603a-603d since the specified maximum number of points (e.g., 4 points) has been reached. Thereafter, in FIG. 6D, smoothing (e.g., Bezier smoothing) of the geo-trace having segments 607b, 609a, and 609b may be performed so that the presentation of the geo-trace may include curves 611 in place of the segments 609a and 609b (e.g., based on the guidelines in Tables 1, 2, and 3).

Figure 7C:
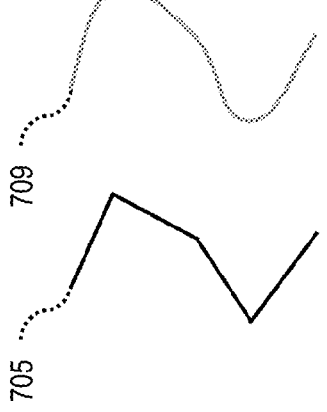

FIGS. 7A-7D are diagrams comparing a traveled route, a GPS trace, and a smoothed trace, according to various embodiments. In FIG. 7A, GPS data points 701 associated with traveled route 703 may be collected as the user is traversing the traveled route 703 (e.g., the user may be carrying a GPS device). As illustrated, however, the GPS trace 705 does not accurately represent the traveled route 703. As shown, in FIG. 7B, GPS data points 701 may be utilized as anchor points, and control points 707 may be identified according to those anchor points (e.g., based on the guidelines in Tables 1 and 2). Thus, the location data points 701 and the control points 707 may be utilized to create the smoothed trace 709 (e.g., based on the guidelines in Tables 1, 2, and 3) which more accurately represents the traveled route 703. Moreover, FIGS. 7C and 7D provides additional comparisons between the traveled route 703, the GPS trace 705, and the smoothed trace 709.

FIGS. 8A and 8B are diagrams illustrating the reduction of sharp corners associated with a geo-trace over a few pixels, according to various embodiments. As shown, in FIG. 8A, an edgy trace 801 (e.g., a sparse GPS trace) overlays a number of pixels. In this scenario, a new trace 805 may then be formed from 4 trace points returned from a simplification algorithm (e.g., a Ramer-Douglas-Peucker algorithm) that took as inputs: (1) a threshold number indicating that the maximum number of points to return is 4; and (2) the collected data points of the edgy trace 801. Thereafter, various control points 807 may be identified (e.g., based on anchor points returned from the simplification algorithm), and then utilized to form the smoothed trace 809. For comparison purposes, FIG. 8B illustrates the edgy trace 801 next to the smoothed trace 809.

Figure 9A:
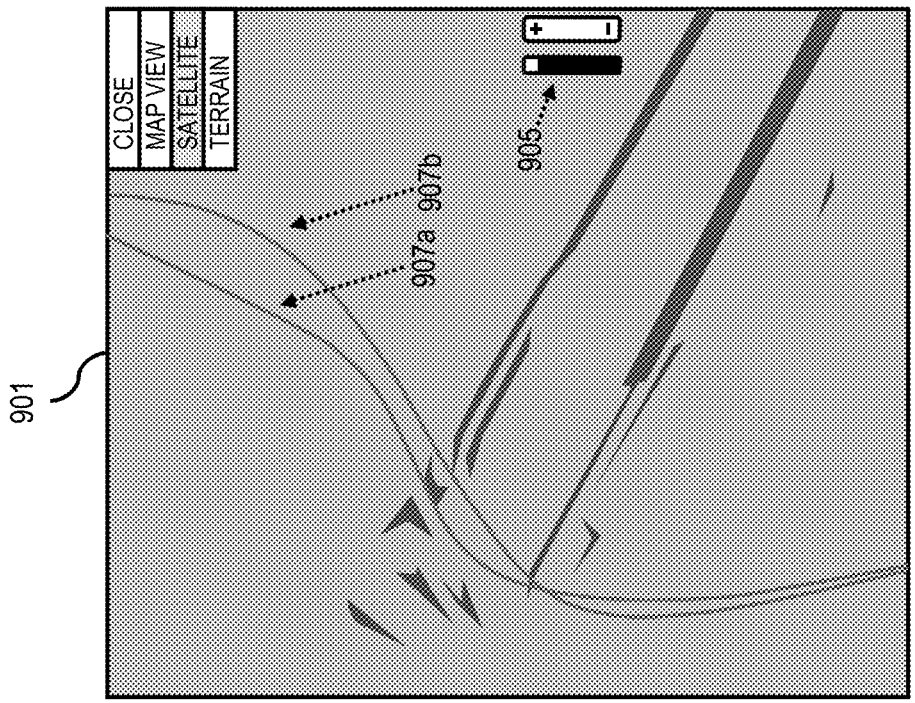
FIGS. 9A and 9B are diagrams featuring a side-by-side comparison of original traces and smoothed traces, according to various embodiments.
Figure 9B:
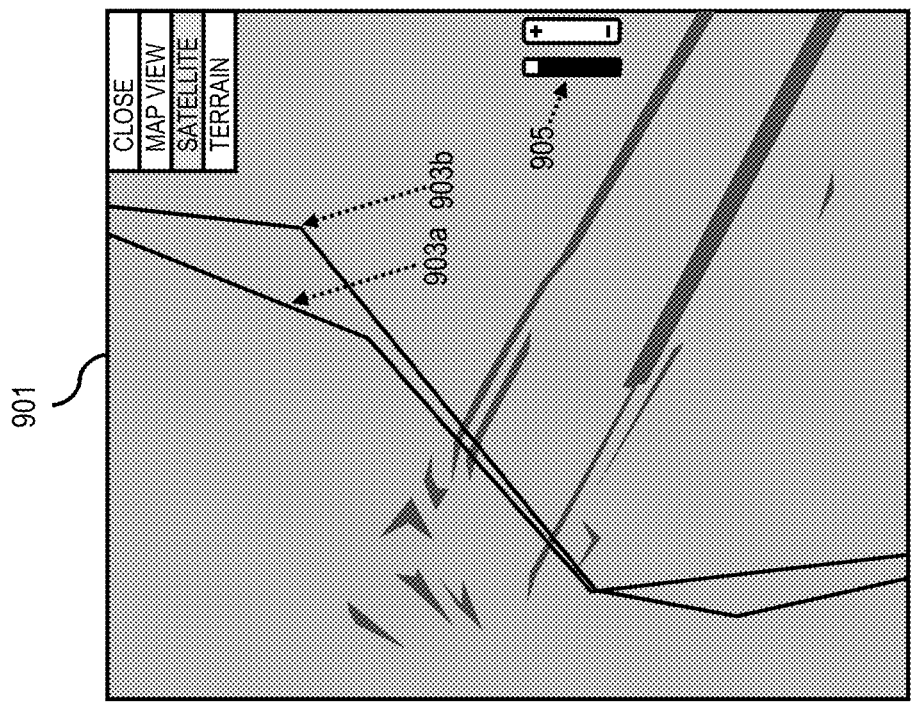

FIGS. 9A and 9B are diagrams featuring a side-by-side comparison of original trace and smoothed traces, according to various embodiments. As shown, in FIG. 9A, user interface 901 depicts a satellite view of original traces 903a and 903b (e.g., GPS traces) at a particular zoom level (e.g., zoom indicator 905). In FIG. 9B, the user interface 901 depicts smooth traces 907a and 907b derived from original traces 903a and 903b (e.g., based on the guidelines in Tables 1, 2, and 3).

Figure 10B:
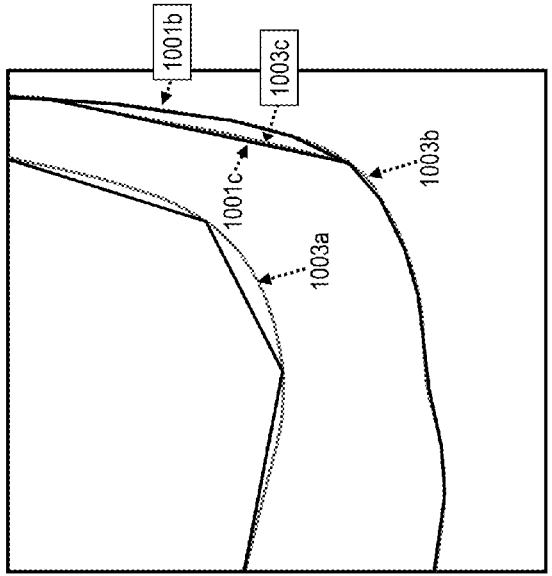
FIGS. 10A-10C are further comparisons of original traces with smoothed traces, according to various embodiments.
Figure 10A:
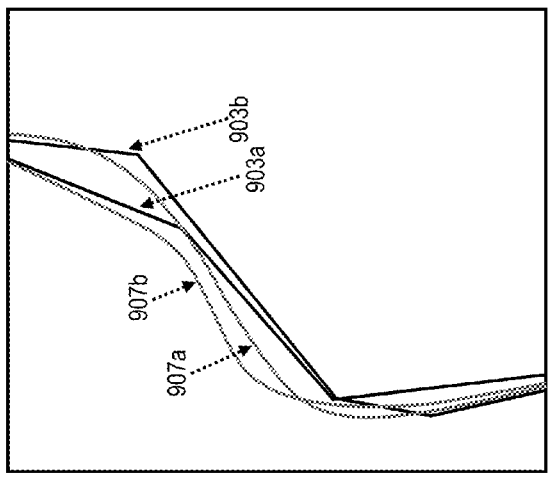
Figure 10C:
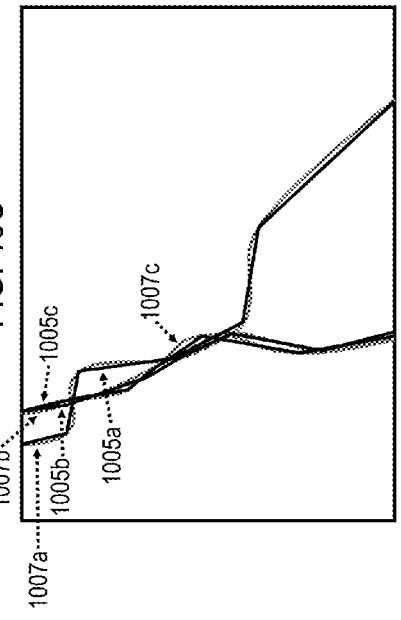

FIGS. 10A-10C are further comparisons of original traces with smoothed traces, according to various embodiments. For example, FIG. 10A illustrates original traces 903a and 903b (e.g., sparse GPS traces) alongside smoothed traces 907a and 907b. FIG. 10B illustrates original traces 1001a-1001c alongside smoothed traces 1003a-1003c. FIG. 10C illustrates original traces 1005a-1005c alongside smoothed traces 1007a-1007c.

Figure 11B:
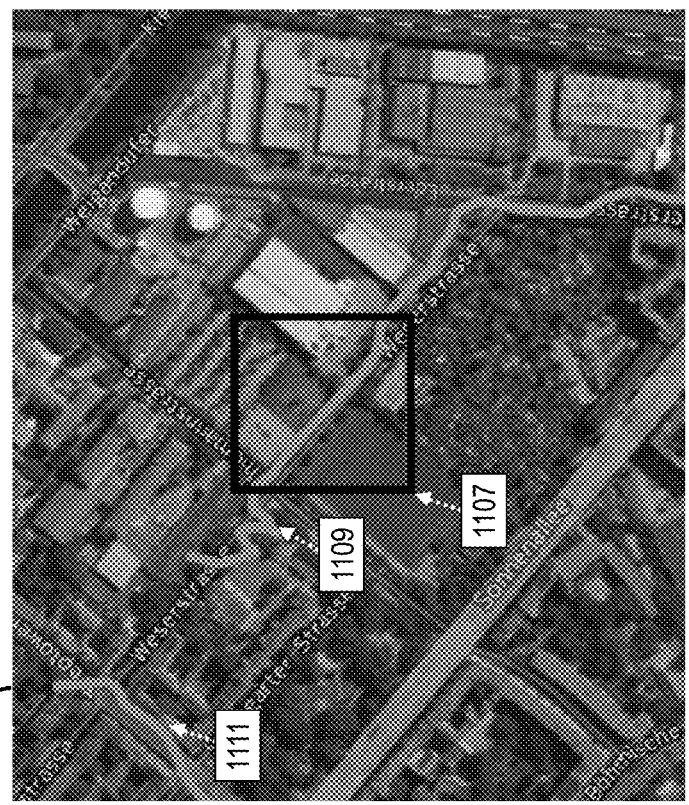
Figure 11A:
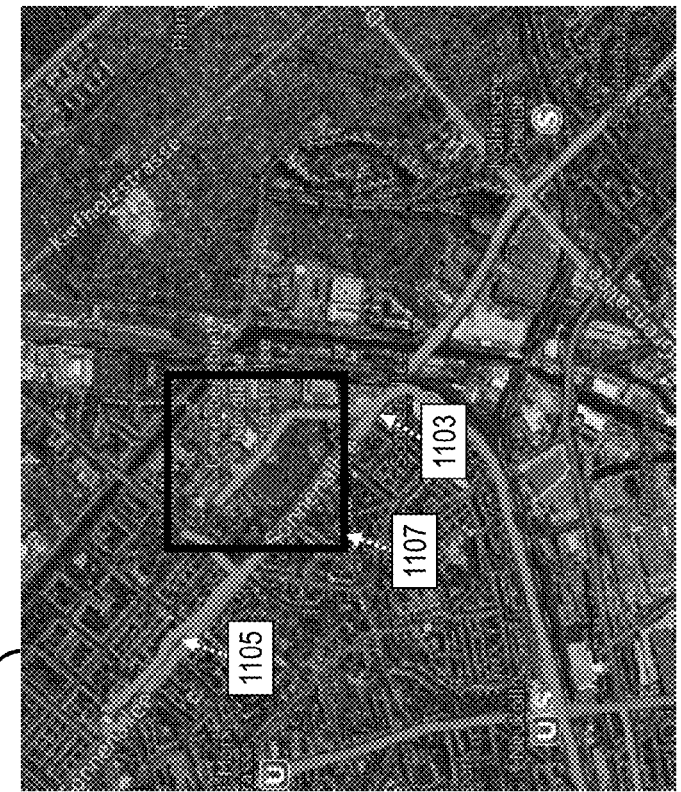

FIGS. 11A-11D are diagrams of a map user interface for presenting geo-traces using a reduced set of points based on an available display area, according to various embodiments. As shown, FIG. 11A illustrates a user interface 1101 depicting smoothed traces 1103 and 1105. As indicated, the smoothed traces 1103 and 1105 may be derived from original GPS traces associated with traveled paths (e.g., based on the guidelines in Tables 1, 2, and 3) according to the zoom level. In addition, FIG. 11A illustrates a zoom indicator 1107, which enables the user to zoom in on a particular area of the user interface 1101. FIG. 11B illustrates the result of the user zooming in on top portion of the smoothed trace 1103. Based on the new zoom level and the new visual extent of the traveled paths, smoothed traces 1109 and 1111 are derived from portions of the original traces (e.g., generated on-the-fly based on the new zoom level, pre-generated based on the particular zoom level, etc.). As depicted, the smoothed traces 1109 and 1111 demonstrate more details than the smoothed traces 1103 and 1105 (e.g., what used to be depicted as an almost straight line now has curves).

FIG. 11C illustrates the result of the user zooming in on a portion of the smoothed trace 1109. Based on the new zoom level and the new visual extent, smoothed trace 1113 is derived from a portion of the original trace associated with the smoothed traces 1103 and 1109. As depicted, the smoothed trace 1113 provides more details with respect to the traveled path than the smoothed trace 1109. Finally, FIG. 11D illustrates the result of the user zooming in on a portion of the smoothed trace 1113. Again, the smoothed trace 1115 is derived from a portion of the original trace associated with the smoothed traces 1103, 1109, and 1113 based on the new zoom level and the new visual extent. As shown, the smoothed trace 1115 demonstrates additional curves in the original trace that were not provided by the smoothed traces 1103, 1109, and 1113.

The processes described herein for presenting geo-traces using a reduced set of points based on an available display area may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 12:
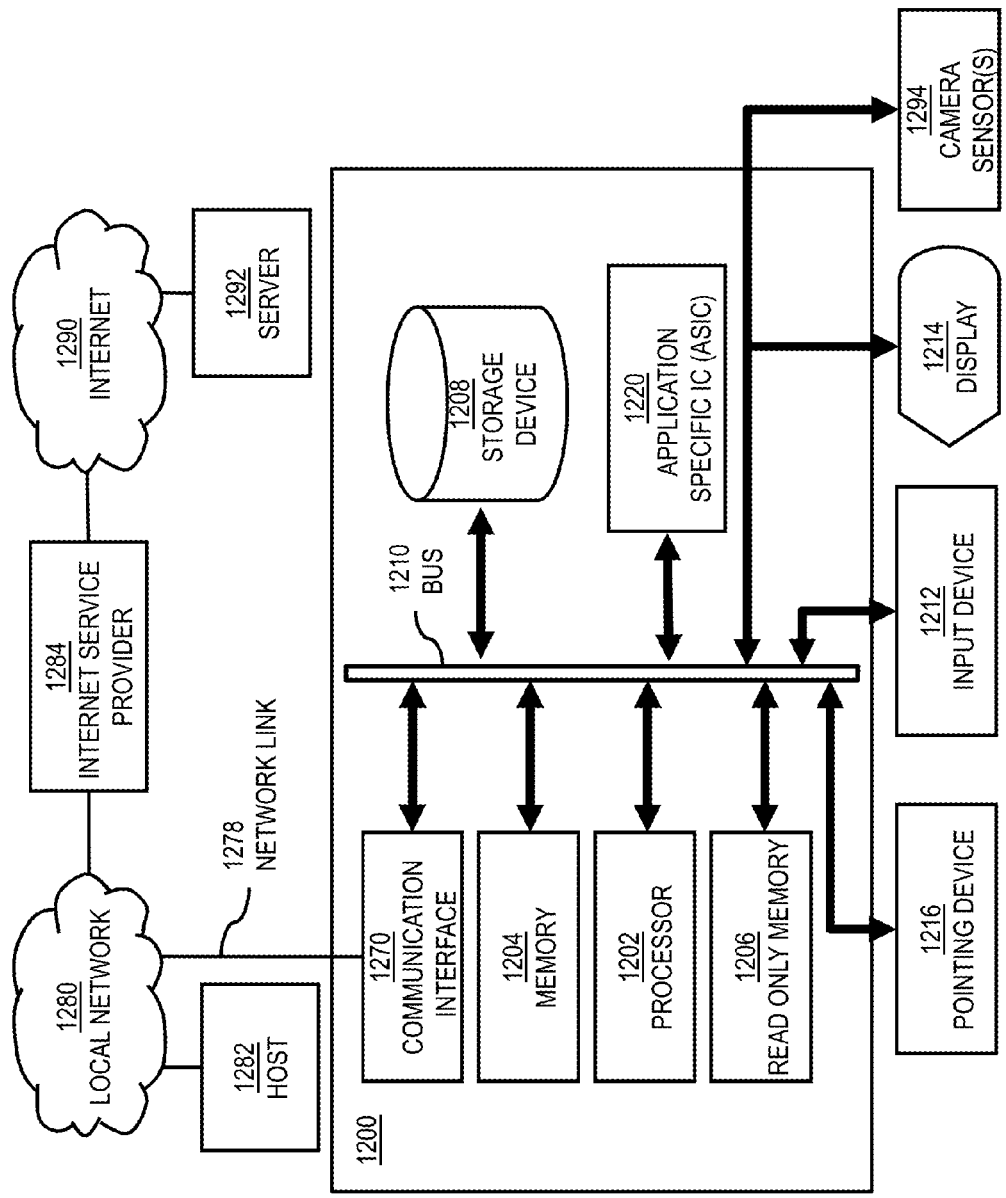
FIG. 12 is a diagram of hardware that can be used to implement an embodiment of the invention.

FIG. 12 illustrates a computer system 1200 upon which an embodiment of the invention may be implemented. Although computer system 1200 is depicted with respect to a particular device or equipment, it is contemplated that other devices or equipment (e.g., network elements, servers, etc.) within FIG. 12 can deploy the illustrated hardware and components of system 1200. Computer system 1200 is programmed (e.g., via computer program code or instructions) to present geo-traces using a reduced set of points based on an available display area as described herein and includes a communication mechanism such as a bus 1210 for passing information between other internal and external components of the computer system 1200. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 1200, or a portion thereof, constitutes a means for performing one or more steps of presenting geo-traces using a reduced set of points based on an available display area.

A bus 1210 includes one or more parallel conductors of information so that information is transferred quickly among devices coupled to the bus 1210. One or more processors 1202 for processing information are coupled with the bus 1210.

A processor (or multiple processors) 1202 performs a set of operations on information as specified by computer program code related to presenting geo-traces using a reduced set of points based on an available display area. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1210 and placing information on the bus 1210. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1202, such as a sequence of operation codes, constitute processor instructions, also called computer system instructions or, simply, computer instructions. Processors may be implemented as mechanical, electrical, magnetic, optical, chemical, or quantum components, among others, alone or in combination.

Computer system 1200 also includes a memory 1204 coupled to bus 1210. The memory 1204, such as a random access memory (RAM) or any other dynamic storage device, stores information including processor instructions for presenting geo-traces using a reduced set of points based on an available display area. Dynamic memory allows information stored therein to be changed by the computer system 1200. RAM allows a unit of information stored at a location called a memory address to be stored and retrieved independently of information at neighboring addresses. The memory 1204 is also used by the processor 1202 to store temporary values during execution of processor instructions. The computer system 1200 also includes a read only memory (ROM) 1206 or any other static storage device coupled to the bus 1210 for storing static information, including instructions, that is not changed by the computer system 1200. Some memory is composed of volatile storage that loses the information stored thereon when power is lost. Also coupled to bus 1210 is a non-volatile (persistent) storage device 1208, such as a magnetic disk, optical disk or flash card, for storing information, including instructions, that persists even when the computer system 1200 is turned off or otherwise loses power.

Information, including instructions for presenting geo-traces using a reduced set of points based on an available display area, is provided to the bus 1210 for use by the processor from an external input device 1212, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 1200. Other external devices coupled to bus 1210, used primarily for interacting with humans, include a display device 1214, such as a cathode ray tube (CRT), a liquid crystal display (LCD), a light emitting diode (LED) display, an organic LED (OLED) display, a plasma screen, or a printer for presenting text or images, and a pointing device 1216, such as a mouse, a trackball, cursor direction keys, or a motion sensor, for controlling a position of a small cursor image presented on the display 1214 and issuing commands associated with graphical elements presented on the display 1214, and one or more camera sensors 1294 for capturing, recording and causing to store one or more still and/or moving images (e.g., videos, movies, etc.) which also may comprise audio recordings. In some embodiments, for example, in embodiments in which the computer system 1200 performs all functions automatically without human input, one or more of external input device 1212, display device 1214 and pointing device 1216 may be omitted.

In the illustrated embodiment, special purpose hardware, such as an application specific integrated circuit (ASIC) 1220, is coupled to bus 1210. The special purpose hardware is configured to perform operations not performed by processor 1202 quickly enough for special purposes. Examples of ASICs include graphics accelerator cards for generating images for display 1214, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1200 also includes one or more instances of a communications interface 1270 coupled to bus 1210. Communication interface 1270 provides a one-way or two-way communication coupling to a variety of external devices that operate with their own processors, such as printers, scanners and external disks. In general the coupling is with a network link 1278 that is connected to a local network 1280 to which a variety of external devices with their own processors are connected. For example, communication interface 1270 may be a parallel port or a serial port or a universal serial bus (USB) port on a personal computer. In some embodiments, communications interface 1270 is an integrated services digital network (ISDN) card or a digital subscriber line (DSL) card or a telephone modem that provides an information communication connection to a corresponding type of telephone line. In some embodiments, a communication interface 1270 is a cable modem that converts signals on bus 1210 into signals for a communication connection over a coaxial cable or into optical signals for a communication connection over a fiber optic cable. As another example, communications interface 1270 may be a local area network (LAN) card to provide a data communication connection to a compatible LAN, such as Ethernet. Wireless links may also be implemented. For wireless links, the communications interface 1270 sends or receives or both sends and receives electrical, acoustic or electromagnetic signals, including infrared and optical signals, that carry information streams, such as digital data. For example, in wireless handheld devices, such as mobile telephones like cell phones, the communications interface 1270 includes a radio band electromagnetic transmitter and receiver called a radio transceiver. In certain embodiments, the communications interface 1270 enables connection to the communication network 105 for presenting geo-traces using a reduced set of points based on an available display area to the UE 101.

The term "computer-readable medium" as used herein refers to any medium that participates in providing information to processor 1202, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 1208. Volatile media include, for example, dynamic memory 1204. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 1220.

Network link 1278 typically provides information communication using transmission media through one or more networks to other devices that use or process the information. For example, network link 1278 may provide a connection through local network 1280 to a host computer 1282 or to equipment 1284 operated by an Internet Service Provider (ISP). ISP equipment 1284 in turn provides data communication services through the public, world-wide packet-switching communication network of networks now commonly referred to as the Internet 1290.

A computer called a server host 1292 connected to the Internet hosts a process that provides a service in response to information received over the Internet. For example, server host 1292 hosts a process that provides information representing video data for presentation at display 1214. It is contemplated that the components of system 1200 can be deployed in various configurations within other computer systems, e.g., host 1282 and server 1292.

At least some embodiments of the invention are related to the use of computer system 1200 for implementing some or all of the techniques described herein. According to one embodiment of the invention, those techniques are performed by computer system 1200 in response to processor 1202 executing one or more sequences of one or more processor instructions contained in memory 1204. Such instructions, also called computer instructions, software and program code, may be read into memory 1204 from another computer-readable medium such as storage device 1208 or network link 1278. Execution of the sequences of instructions contained in memory 1204 causes processor 1202 to perform one or more of the method steps described herein. In alternative embodiments, hardware, such as ASIC 1220, may be used in place of or in combination with software to implement the invention. Thus, embodiments of the invention are not limited to any specific combination of hardware and software, unless otherwise explicitly stated herein.

The signals transmitted over network link 1278 and other networks through communications interface 1270, carry information to and from computer system 1200. Computer system 1200 can send and receive information, including program code, through the networks 1280, 1290 among others, through network link 1278 and communications interface 1270. In an example using the Internet 1290, a server host 1292 transmits program code for a particular application, requested by a message sent from computer 1200, through Internet 1290, ISP equipment 1284, local network 1280 and communications interface 1270. The received code may be executed by processor 1202 as it is received, or may be stored in memory 1204 or in storage device 1208 or any other non-volatile storage for later execution, or both. In this manner, computer system 1200 may obtain application program code in the form of signals on a carrier wave.

Various forms of computer readable media may be involved in carrying one or more sequence of instructions or data or both to processor 1202 for execution. For example, instructions and data may initially be carried on a magnetic disk of a remote computer such as host 1282. The remote computer loads the instructions and data into its dynamic memory and sends the instructions and data over a telephone line using a modem. A modem local to the computer system 1200 receives the instructions and data on a telephone line and uses an infra-red transmitter to convert the instructions and data to a signal on an infra-red carrier wave serving as the network link 1278. An infrared detector serving as communications interface 1270 receives the instructions and data carried in the infrared signal and places information representing the instructions and data onto bus 1210. Bus 1210 carries the information to memory 1204 from which processor 1202 retrieves and executes the instructions using some of the data sent with the instructions. The instructions and data received in memory 1204 may optionally be stored on storage device 1208, either before or after execution by the processor 1202.

FIG. 13 illustrates a chip set or chip 1300 upon which an embodiment of the invention may be implemented. Chip set 1300 is programmed to present geo-traces using a reduced set of points based on an available display area as described herein and includes, for instance, the processor and memory components described with respect to FIG. 12 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 1300 can be implemented in a single chip. It is further contemplated that in certain embodiments the chip set or chip 1300 can be implemented as a single "system on a chip." It is further contemplated that in certain embodiments a separate ASIC would not be used, for example, and that all relevant functions as disclosed herein would be performed by a processor or processors. Chip set or chip 1300, or a portion thereof, constitutes a means for performing one or more steps of providing user interface navigation information associated with the availability of functions. Chip set or chip 1300, or a portion thereof, constitutes a means for performing one or more steps of presenting geo-traces using a reduced set of points based on an available display area.

In one embodiment, the chip set or chip 1300 includes a communication mechanism such as a bus 1301 for passing information among the components of the chip set 1300. A processor 1303 has connectivity to the bus 1301 to execute instructions and process information stored in, for example, a memory 1305. The processor 1303 may include one or more processing cores with each core configured to perform independently. A multi-core processor enables multiprocessing within a single physical package. Examples of a multi-core processor include two, four, eight, or greater numbers of processing cores. Alternatively or in addition, the processor 1303 may include one or more microprocessors configured in tandem via the bus 1301 to enable independent execution of instructions, pipelining, and multithreading. The processor 1303 may also be accompanied with one or more specialized components to perform certain processing functions and tasks such as one or more digital signal processors (DSP) 1307, or one or more application-specific integrated circuits (ASIC) 1309. A DSP 1307 typically is configured to process real-world signals (e.g., sound) in real time independently of the processor 1303. Similarly, an ASIC 1309 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 1300 includes merely one or more processors and some software and/or firmware supporting and/or relating to and/or for the one or more processors.

The processor 1303 and accompanying components have connectivity to the memory 1305 via the bus 1301. The memory 1305 includes both dynamic memory (e.g., RAM, magnetic disk, writable optical disk, etc.) and static memory (e.g., ROM, CD-ROM, etc.) for storing executable instructions that when executed perform the inventive steps described herein to present geo-traces using a reduced set of points based on an available display area. The memory 1305 also stores the data associated with or generated by the execution of the inventive steps.

Figure 14:
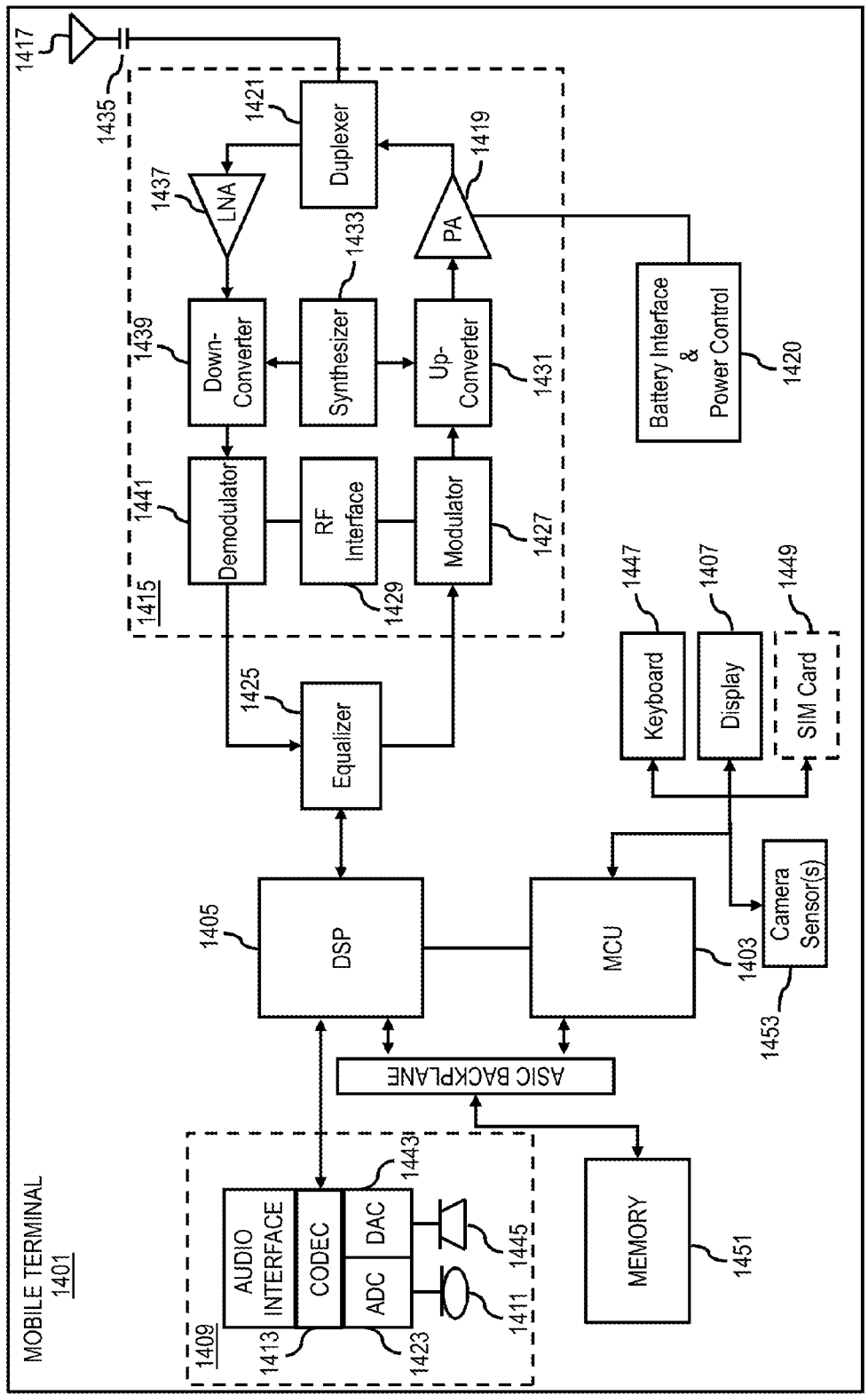
FIG. 14 is a diagram of a mobile terminal (e.g., handset) that can be used to implement an embodiment of the invention.

FIG. 14 is a diagram of exemplary components of a mobile terminal (e.g., handset) for communications, which is capable of operating in the system of FIG. 1, according to one embodiment. In some embodiments, mobile terminal 1401, or a portion thereof, constitutes a means for performing one or more steps of presenting geo-traces using a reduced set of points based on an available display area. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1403, a Digital Signal Processor (DSP) 1405, and a receiver/transmitter unit including a microphone gain control unit and a speaker gain control unit. A main display unit 1407 provides a display to the user in support of various applications and mobile terminal functions that perform or support the steps of presenting geo-traces using a reduced set of points based on an available display area. The display 1407 includes display circuitry configured to display at least a portion of a user interface of the mobile terminal (e.g., mobile telephone). Additionally, the display 1407 and display circuitry are configured to facilitate user control of at least some functions of the mobile terminal. An audio function circuitry 1409 includes a microphone 1411 and microphone amplifier that amplifies the speech signal output from the microphone 1411. The amplified speech signal output from the microphone 1411 is fed to a coder/decoder (CODEC) 1413.

A radio section 1415 amplifies power and converts frequency in order to communicate with a base station, which is included in a mobile communication system, via antenna 1417. The power amplifier (PA) 1419 and the transmitter/modulation circuitry are operationally responsive to the MCU 1403, with an output from the PA 1419 coupled to the duplexer 1421 or circulator or antenna switch, as known in the art. The PA 1419 also couples to a battery interface and power control unit 1420.

In use, a user of mobile terminal 1401 speaks into the microphone 1411 and his or her voice along with any detected background noise is converted into an analog voltage. The analog voltage is then converted into a digital signal through the Analog to Digital Converter (ADC) 1423. The control unit 1403 routes the digital signal into the DSP 1405 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1425 for compensation of any frequency-dependent impairments that occur during transmission though the air such as phase and amplitude distortion. After equalizing the bit stream, the modulator 1427 combines the signal with a RF signal generated in the RF interface 1429. The modulator 1427 generates a sine wave by way of frequency or phase modulation. In order to prepare the signal for transmission, an up-converter 1431 combines the sine wave output from the modulator 1427 with another sine wave generated by a synthesizer 1433 to achieve the desired frequency of transmission. The signal is then sent through a PA 1419 to increase the signal to an appropriate power level. In practical systems, the PA 1419 acts as a variable gain amplifier whose gain is controlled by the DSP 1405 from information received from a network base station. The signal is then filtered within the duplexer 1421 and optionally sent to an antenna coupler 1435 to match impedances to provide maximum power transfer. Finally, the signal is transmitted via antenna 1417 to a local base station. An automatic gain control (AGC) can be supplied to control the gain of the final stages of the receiver. The signals may be forwarded from there to a remote telephone which may be another cellular telephone, any other mobile phone or a landline connected to a Public Switched Telephone Network (PSTN), or other telephony networks.

Voice signals transmitted to the mobile terminal 1401 are received via antenna 1417 and immediately amplified by a low noise amplifier (LNA) 1437. A down-converter 1439 lowers the carrier frequency while the demodulator 1441 strips away the RF leaving only a digital bit stream. The signal then goes through the equalizer 1425 and is processed by the DSP 1405. A Digital to Analog Converter (DAC) 1443 converts the signal and the resulting output is transmitted to the user through the speaker 1445, all under control of a Main Control Unit (MCU) 1403 which can be implemented as a Central Processing Unit (CPU).

The MCU 1403 receives various signals including input signals from the keyboard 1447. The keyboard 1447 and/or the MCU 1403 in combination with other user input components (e.g., the microphone 1411) comprise a user interface circuitry for managing user input. The MCU 1403 runs a user interface software to facilitate user control of at least some functions of the mobile terminal 1401 to present geo-traces using a reduced set of points based on an available display area. The MCU 1403 also delivers a display command and a switch command to the display 1407 and to the speech output switching controller, respectively. Further, the MCU 1403 exchanges information with the DSP 1405 and can access an optionally incorporated SIM card 1449 and a memory 1451. In addition, the MCU 1403 executes various control functions required of the terminal. The DSP 1405 may, depending upon the implementation, perform any of a variety of conventional digital processing functions on the voice signals. Additionally, DSP 1405 determines the background noise level of the local environment from the signals detected by microphone 1411 and sets the gain of microphone 1411 to a level selected to compensate for the natural tendency of the user of the mobile terminal 1401.

The CODEC 1413 includes the ADC 1423 and DAC 1443. The memory 1451 stores various data including call incoming tone data and is capable of storing other data including music data received via, e.g., the global Internet. The software module could reside in RAM memory, flash memory, registers, or any other form of writable storage medium known in the art. The memory device 1451 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1449 carries, for instance, important information, such as the cellular phone number, the carrier supplying service, subscription details, and security information. The SIM card 1449 serves primarily to identify the mobile terminal 1401 on a radio network. The card 1449 also contains a memory for storing a personal telephone number registry, text messages, and user specific mobile terminal settings.

Further, one or more camera sensors 1453 may be incorporated onto the mobile station 1401 wherein the one or more camera sensors may be placed at one or more locations on the mobile station. Generally, the camera sensors may be utilized to capture, record, and cause to store one or more still and/or moving images (e.g., videos, movies, etc.) which also may comprise audio recordings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising facilitating a processing of and/or processing (1) data and/or (2) information and/or (3) at least one signal, the (1) data and/or (2) information and/or (3) at least one signal based, at least in part, on the following:
   at least one determination of a reduced set of one or more points based on an available display area of a user interface;
   a presentation of at least one geo-trace in the user interface based, at least in part, on the reduced set; and
   a smoothing of the at least one geo-trace based, at least in part, on the reduced set,
   wherein the presentation of the at least one geo-trace is further based, at least in part, on the smoothing,
   wherein the at least one geo-trace is derived from positioning system data points collected as a user traverses a traveled route carrying a positioning device,
   wherein the positioning system data points are utilized as anchor points and control points are identified according to the anchor points, and
   wherein the positioning system data points and the control points are utilized to create a smoothed trace in the smoothing of the at least one geo-trace based.

2. A method of claim 1, wherein the (1) data and/or (2) information and/or (3) at least one signal are further based, at least in part, on the following:
   at least one determination of the available display area based, at least in part, on a zoom level associated with the user interface.

3. A method of claim 2, wherein the (1) data and/or (2) information and/or (3) at least one signal are further based, at least in part, on the following:
   at least one determination of a threshold number of points for the presentation of the at least one geo-trace based, at least in part, on the zoom level,
   wherein the reduced set is further based, at least in part, on the threshold number.

4. A method of claim 3, wherein the reduced set is further based, at least in part, on a Ramer-Douglas-Peucker algorithm, and wherein the threshold number represents a maximum number of points to return from the Ramer-Douglas-Peucker algorithm.

5. A method of claim 1, wherein the (1) data and/or (2) information and/or (3) at least one signal are further based, at least in part, on the following:
   at least one determination of one or more other points in between the one or more points of the reduced set; and
   a processing of the one or more points of the reduced set and the one or more other points to cause, at least in part, a generation of one or more curves,
   wherein the smoothing of the at least one geo-trace is further based, at least in part, on the one or more curves.

6. A method of claim 5, wherein the one or more curves include, at least in part, one or more Bezier curves, and wherein the (1) data and/or (2) information and/or (3) at least one signal are further based, at least in part, on the following:
   a designation of the one or more points as one or more anchor points of the one or more Bezier curves, the one or more other points as one or more control points of the one or more Bezier curves, or a combination thereof.

7. A method of claim 5, wherein the (1) data and/or (2) information and/or (3) at least one signal are further based, at least in part, on the following:
   at least one determination that at least one of the one or more points of the reduced set are within proximity to at least one corner of the at least one geo-trace,
   wherein at least one of the one or more curves is based, at least in part, on the at least one of the one or more points.

8. A method of claim 1, wherein the at least one geo-trace represents one or more movements, one or more lines, or a combination thereof in a two-dimensional space, a three-dimensional space, or a combination thereof.

9. An apparatus comprising:
   at least one processor; and
   at least one memory including computer program code for one or more programs,
   the at least one memory and the computer program code configured to, with the at least one processor, cause the apparatus to perform at least the following,
   determine a reduced set of one or more points based on an available display area of a user interface;
   cause, at least in part, a presentation of at least one geo-trace in the user interface based, at least in part, on the reduced set; and
   cause, at least in part, a smoothing of the at least one geo-trace based, at least in part, on the reduced set,
   wherein the presentation of the at least one geo-trace is further based, at least in part, on the smoothing,
   wherein the at least one geo-trace is derived from positioning system data points collected as a user traverses a traveled route carrying a positioning device,
   wherein the positioning system data points are utilized as anchor points and control points are identified according to the anchor points, and
   wherein the positioning system data points and the control points are utilized to create a smoothed trace in the smoothing of the at least one geo-trace based.

10. An apparatus of claim 9, wherein the apparatus is further caused to:
   determine the available display area based, at least in part, on a zoom level associated with the user interface.

11. An apparatus of claim 10, wherein the apparatus is further caused to:
   determine a threshold number of points for the presentation of the at least one geo-trace based, at least in part, on the zoom level,
   wherein the reduced set is further based, at least in part, on the threshold number.

12. An apparatus of claim 11, wherein the reduced set is further based, at least in part, on a Ramer-Douglas-Peucker algorithm, and wherein the threshold number represents a maximum number of points to return from the Ramer-Douglas-Peucker algorithm.

13. An apparatus of claim 9, wherein the apparatus is further caused to:
   determine one or more other points in between the one or more points of the reduced set; and
   process and/or facilitate a processing of the one or more points of the reduced set and the one or more other points to cause, at least in part, a generation of one or more curves,
   wherein the smoothing of the at least one geo-trace is further based, at least in part, on the one or more curves.

14. An apparatus of claim 13, wherein the one or more curves include, at least in part, one or more Bezier curves, and wherein the apparatus is further caused to:
   cause, at least in part, a designation of the one or more points as one or more anchor points of the one or more Bezier curves, the one or more other points as one or more control points of the one or more Bezier curves, or a combination thereof.

15. An apparatus of claim 13, wherein the apparatus is further caused to:
   determine that at least one of the one or more points of the reduced set are within proximity to at least one corner of the at least one geo-trace,
   wherein at least one of the one or more curves is based, at least in part, on the at least one of the one or more points.

16. An apparatus of claim 9, wherein the at least one geo-trace represents one or more movements, one or more lines, or a combination thereof in a two-dimensional space, a three-dimensional space, or a combination thereof.

17. A non-transitory computer-readable storage medium carrying one or more sequences of one or more instructions which, when executed by one or more processors, cause an apparatus to at least perform the following steps:
   determining a reduced set of one or more points based on an available display area of a user interface;
   causing, at least in part, a presentation of at least one geo-trace in the user interface based, at least in part, on the reduced set; and
   causing, at least in part, a smoothing of the at least one geo-trace based, at least in part, on the reduced set,
   wherein the presentation of the at least one geo-trace is further based, at least in part, on the smoothing,
   wherein the at least one geo-trace is derived from positioning system data points collected as a user traverses a traveled route carrying a positioning device,
   wherein the positioning system data points are utilized as anchor points and control points are identified according to the anchor points, and wherein the positioning system data points and the control points are utilized to create a smoothed trace in the smoothing of the at least one geo-trace based.

18. A non-transitory computer-readable storage medium of claim 17, wherein the apparatus is caused to further perform:
   determining the available display area based, at least in part, on a zoom level associated with the user interface; and
   determining a threshold number of points for the presentation of the at least one geo-trace based, at least in part, on the zoom level,
   wherein the reduced set is further based, at least in part, on the threshold number.

\* \* \* \* \*